United States Patent
Hong et al.

(10) Patent No.: US 11,006,122 B2
(45) Date of Patent: May 11, 2021

(54) STATIC VIDEO RECOGNITION

(71) Applicant: Google LLC, Mountain View, CA (US)

(72) Inventors: Wei Hong, Sunnyvale, CA (US);
Shengyi Lin, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/772,069

(22) PCT Filed: Mar. 8, 2019

(86) PCT No.: PCT/US2019/021442
§ 371 (c)(1),
(2) Date: Jun. 11, 2020

(87) PCT Pub. No.: WO2019/177906
PCT Pub. Date: Sep. 19, 2019

(65) Prior Publication Data
US 2021/0021833 A1    Jan. 21, 2021

Related U.S. Application Data

(60) Provisional application No. 62/641,383, filed on Mar. 11, 2018.

(51) Int. Cl.
*H04N 5/232*    (2006.01)
*G06T 7/20*    (2017.01)
(Continued)

(52) U.S. Cl.
CPC ............ *H04N 19/137* (2014.11); *G06T 3/40* (2013.01); *G06T 5/002* (2013.01); *H04N 19/176* (2014.11);
(Continued)

(58) Field of Classification Search
None
See application file for complete search history.

(56) References Cited

U.S. PATENT DOCUMENTS

2004/0252230 A1    12/2004  Winder
2008/0204602 A1*    8/2008  Beric ................ H04N 19/433
                                            19/433
(Continued)

FOREIGN PATENT DOCUMENTS

EP          2101486         9/2009
JP         2008131572       6/2008
(Continued)

OTHER PUBLICATIONS

EPO, International Search Report for International Patent Application No. PCT/US2019/021442, dated Jun. 28, 2019, 4 pages.
(Continued)

*Primary Examiner* — Frederick D Bailey
(74) *Attorney, Agent, or Firm* — IP Spring

(57) ABSTRACT

A computer-implemented method, system, or computer-readable medium may include estimating local motion of an input video frame of an input video by computing a local motion vector corresponding to a respective candidate pixel patch from among one or more candidate pixel patches within the input video frame. Global motion may be estimated by computing a global motion vector. One or more subject motion vectors may be computed based on a corresponding local motion vector and the global motion vector. A number of static frames of the video may be identified. The input video may be determined to be a static video if a ratio of the number of static frames to a number of the video frames in the input video meets a static frame threshold and determining that the input video is a motion video if the ratio fails to meet the static frame threshold.

20 Claims, 5 Drawing Sheets

(51) Int. Cl.
    *H04N 19/137*    (2014.01)
    *H04N 19/30*     (2014.01)
    *H04N 19/513*    (2014.01)
    *G06T 3/40*      (2006.01)
    *G06T 5/00*      (2006.01)
    *H04N 19/176*    (2014.01)

(52) U.S. Cl.
    CPC ........... *H04N 19/30* (2014.11); *H04N 19/521* (2014.11); *G06T 2207/10016* (2013.01); *G06T 2207/20076* (2013.01)

(56) References Cited

U.S. PATENT DOCUMENTS

| | | |
|---|---|---|
| 2013/0293737 A1 | 11/2013 | Yim et al. |
| 2014/0056479 A1* | 2/2014 | Bobbitt ............ G06K 9/00771 |
| | | 382/104 |
| 2014/0177734 A1* | 6/2014 | Carmel ................ H04N 19/154 |
| | | 375/240.26 |
| 2015/0364158 A1 | 12/2015 | Gupte et al. |

FOREIGN PATENT DOCUMENTS

| | | | |
|---|---|---|---|
| JP | 2010283412 | | 12/2010 |
| WO | WO 2010/078759 | * | 7/2010 |

OTHER PUBLICATIONS

EPO, Written Opinion for International Patent Application No. PCT/US2019/021442, dated Jun. 28, 2019, 7 pages.
EPO, Communication Under Rule 71(3) EPC for European Patent Application No. 19712666.7, dated Nov. 20, 2020, 7 pages.
EPO, Communication Under Rule 71(3) EPC for European Patent Application No. 19712666.7, dated Feb. 18, 2021, 7 pages.
EPO, Extended European Search Report for European Patent Application No. 20216533.8, dated Feb. 9, 2021, 9 pages.

* cited by examiner

STATIC VIDEO RECOGNITION

CROSS-REFERENCE TO RELATED APPLICATIONS

The present application is a U.S. National Phase application of International Patent Application No. PCT/US2019/021442, filed Mar. 8, 2019 and titled "Static Video Recognition," which claims priority to U.S. Provisional Patent Application No. 62/641,383, filed Mar. 11, 2018 and titled "Static Video Recognition," the entire contents of both of which are hereby incorporated by reference.

BACKGROUND

Some mobile devices may include a capability of capturing video and still images. In some cases, a video can be captured that records images occurring just prior to and just after detecting a shutter press to capture a still image. Such videos can be entertaining and helpful for capturing images of subject matter that a single still image may not contain. However, a video of a static or generally static scene such as a building or landscape, may not be beneficial to a user and may not be worthwhile to store in on-device memory or external storage. Technical difficulties exist for distinguishing between static videos and videos with movement. For example, if an image is captured using a mobile device, the user's hand may shake enough that it appears as if the video included movement. Accordingly, recognizing that a video is static (e.g., a recording of a relatively static scene or subject) may be useful.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Some implementations are generally related to mobile device image capture, and in particular to methods and systems for recognizing a static video.

Some implementations can include a computer-implemented method. The method can include obtaining an input video frame from among one or more video frames of an input video, wherein the video frames were acquired prior to receiving a shutter press indication and following a receiving of the shutter press indication. The method further includes downsampling the input video frame to generate a downsampled video frame. The method further includes smoothing the downsampled video frame to generate a smoothed video frame. The method further includes computing a temporal gradient and a spatial gradient for the smoothed video frame. The method further includes estimating local motion by computing a local motion vector corresponding to a respective candidate pixel patch from among one or more candidate pixel patches within the smoothed video frame, where the local motion vector is based on the spatial gradient and the temporal gradient. The method further includes estimating global motion by computing a global motion vector corresponding to the smoothed video frame. The method further includes computing one or more subject motion vectors based on a corresponding local motion vector and the global motion vector. The method further includes converting the one or more subject motion vectors into a score map. The method further includes computing an entropy score based on the score map. The method further includes mapping the entropy score into a subject motion score corresponding to the smoothed video frame. The method further includes identifying a number of static frames based on the subject motion score. The method further includes determining that the input video is a static video if a ratio of the number of static frames to a number of the video frames in the input video meets a static frame threshold and determining that the input video is a motion video if the ratio fails to meet the static frame threshold. The method further includes performing a first operation if the input video is recognized to be the static video. The method further includes performing a second operation if the input video is recognized to be the motion video.

The method can also include converting the downsampled video frame from color to gray scale prior to smoothing. In some embodiments, computing the spatial gradient and the temporal gradient for the smoothed video frame includes: marking underexposed pixels in the smoothed video frame and overexposed pixels in the smoothed video frame as invalid; and for valid pixels within the smoothed video frame: computing a temporal gradient; computing a spatial gradient in an x direction; and computing a spatial gradient in a y direction. In some embodiments, the one or more candidate pixel patches are determined by: selecting one or more grid points as reference points within the smoothed video frame for motion estimation; selecting a pixel patch width and pixel patch height for a pixel patch corresponding to each of the one or more grid points; computing statistics for each pixel patch; determining if the pixel patch has a texture that meets a threshold texture value; and if the pixel patch has the texture that meets the threshold texture value, identifying the pixel patch as a candidate pixel patch for motion estimation. In some embodiments, computing the local motion vector includes computing a local x motion value and computing a local y motion value based on the spatial gradient and the temporal gradient for pixels in the candidate pixel patch. In some embodiments, computing the global motion vector includes computing the global motion vector based on an average of valid local motion vectors. In some embodiments, computing the one or more subject motion vectors includes subtracting the global motion vector from a respective local motion vector. In some embodiments, converting the one or more subject motion vectors into the score map includes normalizing a magnitude of a respective subject motion vector for pixels within the smoothed video frame. In some embodiments, computing the subject motion score, which is inversely correlated to the entropy score on the score map, includes assigning a higher score to the smoothed video frame when motion is localized and assigning a lower score to the smoothed video frame when motion is global within the smoothed video frame. In some embodiments, the first operation includes marking the input video as static, retaining a shutter image corresponding to the input video in storage, and deleting the input video from storage. In some embodiments, the second operation includes retaining a shutter image corresponding to the input video and the input video in storage.

Some implementations can include a system. The system may comprise one or more processors; and a memory with instructions stored thereon that, when executed by the one or more processors, cause the one or more processors to perform operations comprising: obtaining an input video frame from among one or more video frames of an input video, wherein the video frames were acquired prior to receiving a shutter press indication and following a receiving of the shutter press indication, downsampling the input video frame to generate a downsampled video frame, smoothing the downsampled video frame to generate a smoothed video frame, computing a temporal gradient and a spatial gradient for the smoothed video frame, estimating local motion by computing a local motion vector corresponding to a respective candidate pixel patch from among one or more candidate pixel patches within the smoothed video frame, wherein the local motion vector is based on the spatial gradient and the temporal gradient, estimating global motion by computing a global motion vector corresponding to the smoothed video frame, computing one or more subject motion vectors based on a corresponding local motion vector and the global motion vector, converting the one or more subject motion vectors into a score map, computing an entropy score based on the score map, mapping the entropy score into a subject motion score corresponding to the smoothed video frame, identifying a number of static frames based on the subject motion score, determining that the input video is a static video if a ratio of the number of static frames to a number of the video frames in the input video meets a static frame threshold and determining that the input video is a motion video if the ratio fails to meet the static frame threshold, performing a first operation if the input video is recognized to be the static video, and performing a second operation if the input video is recognized to be the motion video.

In some embodiments, the instructions further cause the one or more processors to perform operations comprising converting the downsampled video frame from color to gray scale prior to smoothing. In some embodiments, computing the spatial gradient and the temporal gradient for the smoothed video frame includes: marking underexposed pixels in the smoothed video frame and overexposed pixels in the smoothed video frame as invalid; and for valid pixels within the smoothed video frame: computing a temporal gradient; computing a spatial gradient in an x direction; and computing a spatial gradient in a y direction. In some embodiments, the one or more candidate pixel patches are determined by: selecting one or more grid points as reference points within the smoothed video frame for motion estimation, selecting a pixel patch width and pixel patch height for a pixel patch corresponding to each of the one or more grid points, computing statistics for each pixel patch, determining if the pixel patch has a texture that meets a threshold texture value, and if the pixel patch has the texture that meets the threshold texture value, identifying the pixel patch as a candidate pixel patch for motion estimation.

Some implementations can include a non-transitory computer readable medium with instructions that, when executed by one or more computers, cause the one or more computers to perform operations, the operations comprising: obtaining an input video frame from among one or more video frames of an input video, wherein the video frames were acquired prior to receiving a shutter press indication and following a receiving of the shutter press indication, downsampling the input video frame to generate a downsampled video frame, smoothing the downsampled video frame to generate a smoothed video frame, computing a temporal gradient and a spatial gradient for the smoothed video frame, estimating local motion by computing a local motion vector corresponding to a respective candidate pixel patch from among one or more candidate pixel patches within the smoothed video frame, wherein the local motion vector is based on the spatial gradient and the temporal gradient, estimating global motion by computing a global motion vector corresponding to the smoothed video frame, computing one or more subject motion vectors based on a corresponding local motion vector and the global motion vector, converting the one or more subject motion vectors into a score map, computing an entropy score based on the score map, mapping the entropy score into a subject motion score corresponding to the smoothed video frame, identifying a number of static frames based on the subject motion score, determining that the input video is a static video if a ratio of the number of static frames to a number of the video frames in the input video meets a static frame threshold and determining that the input video is a motion video if the ratio fails to meet the static frame threshold, performing a first operation if the input video is recognized to be the static video, and performing a second operation if the input video is recognized to be the motion video.

In some embodiments, the operations further comprise converting the downsampled video frame from color to gray scale prior to smoothing. In some embodiments, computing the spatial gradient and the temporal gradient for the smoothed video frame includes: marking underexposed pixels in the smoothed video frame and overexposed pixels in the smoothed video frame as invalid; and for valid pixels within the smoothed video frame: computing a temporal gradient; computing a spatial gradient in an x direction; and computing a spatial gradient in a y direction. In some embodiments, the one or more candidate pixel patches are determined by: selecting one or more grid points as reference points within the smoothed video frame for motion estimation, selecting a pixel patch width and pixel patch height for a pixel patch corresponding to each of the one or more grid points, computing statistics for each pixel patch, determining if the pixel patch has a texture that meets a threshold texture value, and if the pixel patch has the texture that meets the threshold texture value, identifying the pixel patch as a candidate pixel patch for motion estimation. In some embodiments, computing the local motion vector includes computing a local x motion value and computing a local y motion value based on the spatial gradient and the temporal gradient for pixels in the candidate pixel patch.

DETAILED DESCRIPTION

The systems and methods provided herein may overcome one or more deficiencies of some conventional imaging systems and methods. For example, imaging devices (e.g., smartphones, etc.) permit users to capture video and still images with a single shutter press event. Some implementations of the systems and methods provided herein can recognize static video (e.g., video of a static scene or a static subject) and take an action based on the recognition of a static video (e.g., delete or remove the static video from storage) that can help reduce memory usage, communication bandwidth usage, and/or processor cycle usage. In particular, some implementations can help compensate for global motion in image acquisition (e.g., hand shake in a smartphone or other device during image acquisition) and help reduce detection of motion when the motion is widespread across a frame by using an entropy-computation based scoring system to emphasize localized subject motion (e.g., a child playing) and help deemphasize widespread general motion (e.g., tree leaves moving in the wind). Some conventional imaging systems may not provide an efficient and effective way to recognize static video, where efficiently and effectively recognizing static video may be useful to a user.

Figure 1:
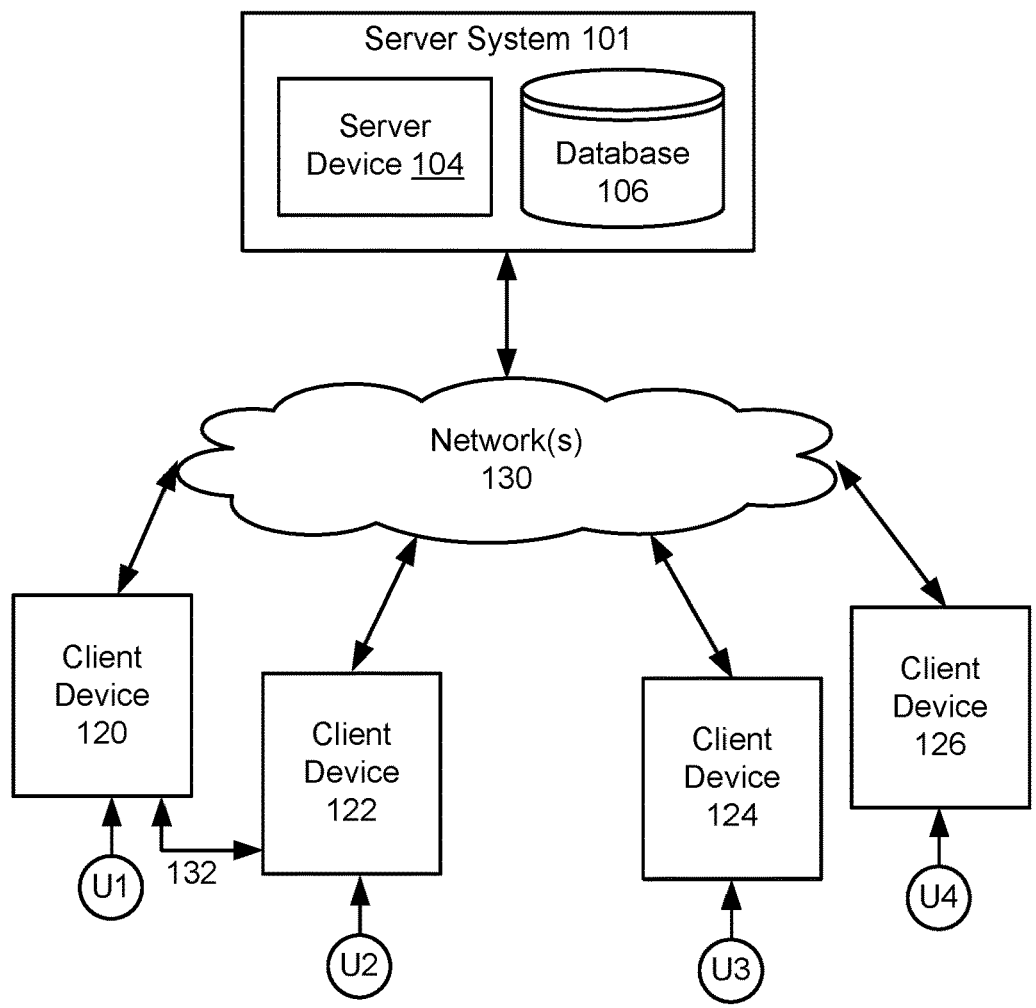
FIG. 1 is a block diagram of example systems and a network environment which may be used for one or more implementations described herein.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication 132 between devices, e.g., using peer-to-peer wireless protocols.

For ease of illustration, FIG. 1 shows one block for server system 102, server device 104, and database 106, and shows four blocks for client devices 120, 122, 124, and 126. Blocks representing server system 102, 104, and 106 may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices.

Each client device can be any type of electronic device, e.g., desktop computer, laptop computer, portable or mobile device, camera, cell phone, smart phone, tablet computer, television, TV set top box or entertainment device, wearable devices (e.g., display glasses or goggles, head-mounted display (HMD), wristwatch, headset, armband, jewelry, etc.), virtual reality (VR) and/or augmented reality (AR) enabled devices, personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may comprise one or more participants in a conversation and may communicate with server system 102 and/or each other using respective client devices 120, 122, 124, and 126. In some examples, users U1, U2, U3, and U4 may interact with each other via applications running on respective client devices and/or server system 102, and/or via a network service, e.g., an image sharing service, a messaging service, a social network service or other type of network service, implemented on server system 102. For example, respective client devices 120, 122, 124, and 126 may communicate data to and from one or more server systems (e.g., server system 102).

In some implementations, the server system 102 may provide appropriate data to the client devices such that each client device can receive communicated content or shared content uploaded to the server system 102 and/or network service. In some examples, the users can interact via audio or video conferencing, audio, video, or text chat, or other communication modes or applications. In some examples, the network service can include any system allowing users to perform a variety of communications, form links and associations, upload and post shared content such as images, image compositions (e.g., albums that include one or more images, image collages, videos, etc.), audio data, and other types of content, receive various forms of data, and/or perform socially-related functions. For example, the network service can allow a user to send messages to particular or multiple other users, form social links in the form of associations to other users within the network service, group other users in user lists, friends lists, or other user groups, post or send content including text, images, image compositions, audio sequences or recordings, or other types of content for access by designated sets of users of the network service, participate in live video, audio, and/or text videoconferences or chat with other users of the service, etc. In some implementations, a "user" can include one or more programs or virtual entities, as well as persons that interface with the system or network.

A user interface can enable display of images, image compositions, data, and other content as well as communications, privacy settings, notifications, and other data on a client device 120, 122, 124, and 126 (or alternatively on server system 102). Such an interface can be displayed using software on the client device, software on the server device, and/or a combination of client software and server software executing on server device 104, e.g., application software or client software in communication with server system 102. The user interface can be displayed by a display device of a client device or server device, e.g., a display screen, projector, etc. In some implementations, application programs running on a server system can communicate with a client device to receive user input at the client device and to output data such as visual data, audio data, etc. at the client device.

Various implementations of features described herein can use any type of system and/or service. For example, social networking services, image collection and sharing services, assisted messaging services or other networked services (e.g., connected to the Internet) can include one or more described features accessed by client and server devices. Any type of electronic device can make use of features described herein. Some implementations can provide one or more features described herein on client or server devices disconnected from or intermittently connected to computer networks. In some examples, a client device including or connected to a display device can examine and display images stored on storage devices local to the client device (e.g., not connected via a communication network) and can provide features and results as described herein that are viewable to a user.

Figure 2:
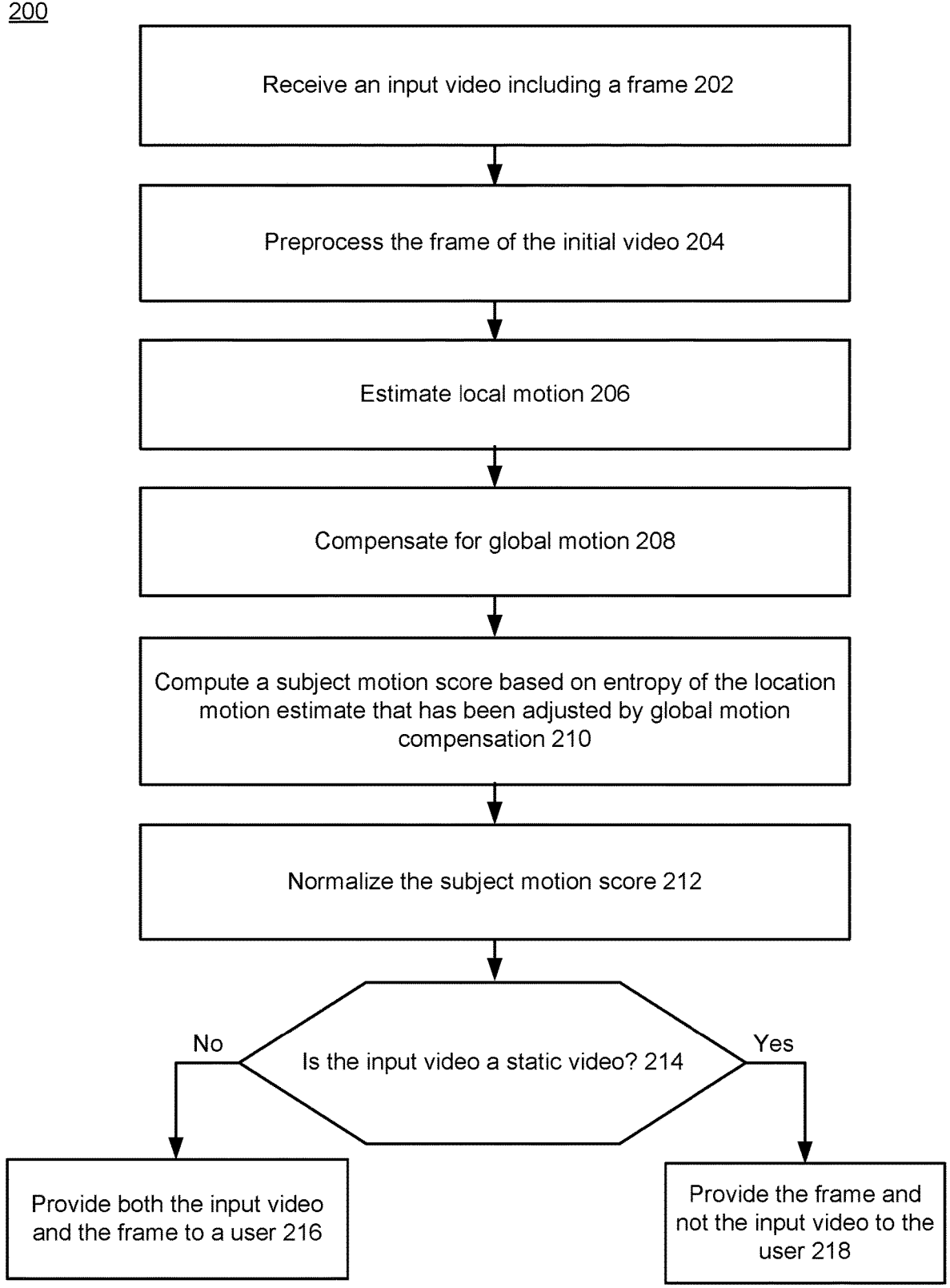
FIG. 2 is a flow diagram illustrating an example method of recognizing static video in accordance with some implementations.

FIG. 2 is a flow diagram illustrating an example method 200 (e.g., a computer-implemented method) to recognize static videos according to some implementations. Static videos can include videos where a given percentage of frames of the video are determined to be static as described herein. Static videos can also include videos which are static for certain time portions of the video and in which motion may occur at other time portions (e.g., the video is static from the beginning until near the end of the video when the subject moves or when the device taking the images is lowered or moved, etc.). Alternatively, videos in which motions occur at certain portions of the video (e.g., beginning, middle, or end) may be recognized as motion videos or as static videos depending on a particular implementation. In general, parameters for recognizing a static video can be added, adjusted, configured, or removed based on a contemplated application or implementation of the subject matter disclosed herein. Such parameters can include thresholds for local motion estimates, thresholds for subject motion scores, thresholds for a ratio of frames with a subject motion score meeting a threshold to other frames of the video, etc. The thresholds are discussed in greater detail below with reference to FIG. 4.

In some implementations, method 200 (and method 400) can be implemented, for example, on a server system 102 as shown in FIG. 1. In other implementations, some or all of the method 200 can be implemented on one or more client devices 120, 122, 124, or 126 as shown in FIG. 1, one or more server devices, and/or on both server device(s) and client device(s). In described examples, the implementing system includes one or more digital hardware processors or processing circuitry ("processors"), and one or more storage devices (e.g., a database 106 or other storage). In some implementations, different components of one or more servers and/or clients can perform different blocks or other parts of the method 200.

Some implementations can initiate method 200 based on user input and/or device context (obtained with permission of the user). A user may, for example, have selected the initiation of the method 200 from a displayed user interface. In some implementations, method 200 or portions thereof can be performed with guidance by the user via user input. For example, some implementations can include presenting an option to a user to enable or disable static video recognition. The system may not use, process or store user information such as video and image information, etc. without explicit permission from the user.

In some implementations, method 200 may be automatically invoked (or automatically invoked with user permission). For example, the recognition of static video may be performed automatically when a user is taking photos and can be used to determine whether to present videos associated with a photo to a user (e.g., if a video is recognized to be static, then the video may not be presented or stored, and, if a video is determined to be a motion video, the video can be stored and presented to a user, e.g., when the user views the photo that the video is associated with).

In some implementations, the method 200, or portions of the method, can be initiated automatically by a device. For example, the method (or portions thereof) can be periodically performed, or performed based on the occurrence of one or more particular events or conditions. For example, such events or conditions can include a given number of photos having been acquired by the user, received by, uploaded to, or otherwise accessible by a device (e.g. a user device), a predetermined time period having expired since the last performance of method 200, and/or one or more other events or conditions occurring which can be specified in settings of a device implementing method 200. In some implementations, such conditions can be previously specified by a user in stored custom preferences of the user (accessible by a device or method with user consent). In some examples, a device (server or client) can perform the method 200 with access to one or more applications that receive electronic conversation messages (if user consent is received). In another example, a camera, cell phone, tablet computer, wearable device, or other client device can acquire video and still images and can perform the method 200. In addition, or alternatively, a client device can send one or more videos to a server over a network, and the server can process the videos using method 200. The above discussion regarding method 200 also applies to method 400.

At 202, an input video including a frame is received. For example, the video may be captured by a client device, such as a mobile device, associated with a user. The video may be captured in response to the shutter press of a camera or other imaging device to capture the frame. For example, a user may open a camera application on a smart phone or other mobile device. The camera application can start to acquire video images before a shutter press indication is received and continue to capture video after the shutter press indication is received. Thus, the video captures the moments just before and just after a shutter press within the camera application executing on the smart phone. Processing continues to 204.

Figure 3:
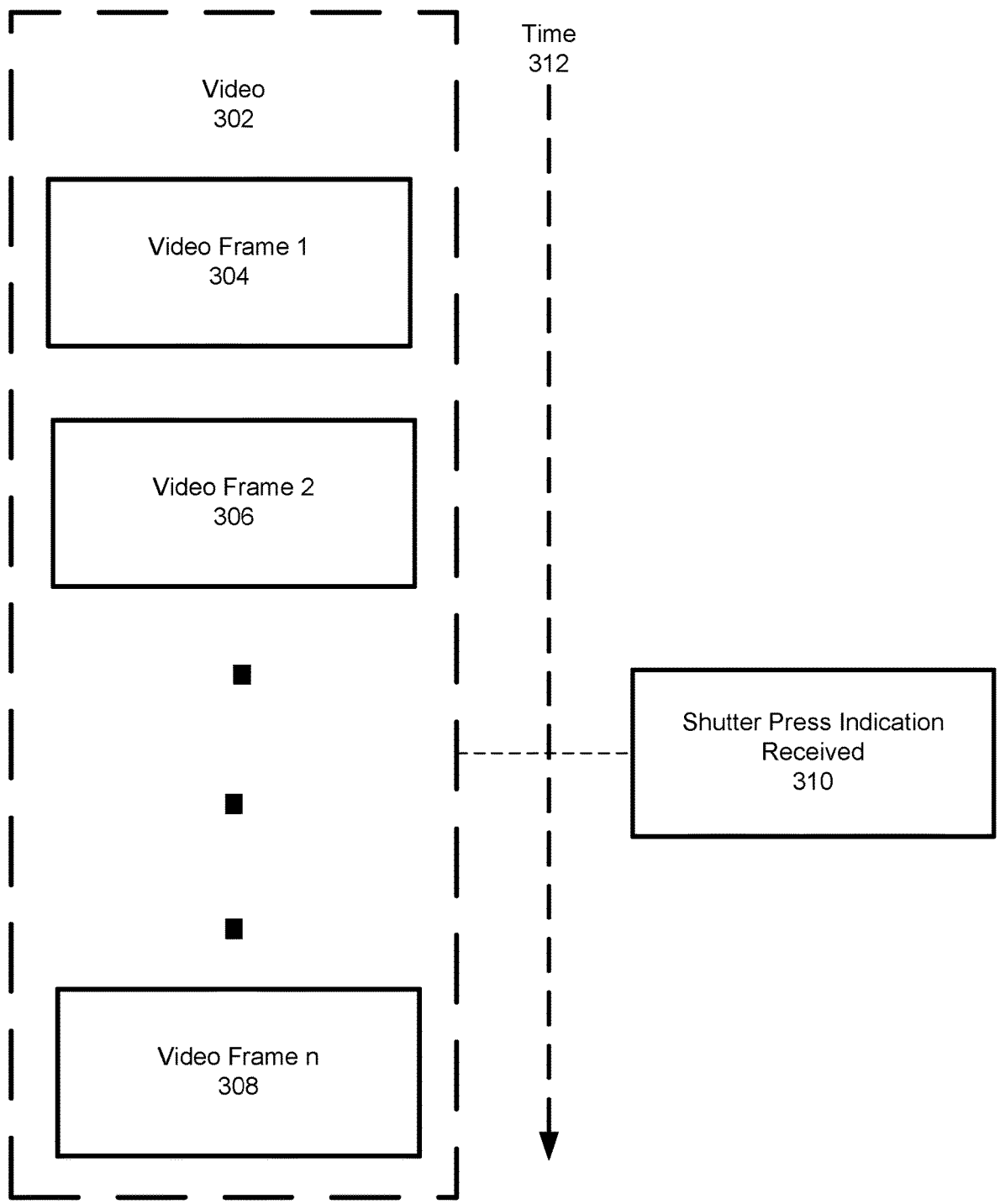
FIG. 3 is a diagram of an example video and shutter press timeline in accordance with some implementations.

For example, as shown in FIG. 3, the video 302 can include frames (304, 306) captured before a shutter press indication 310 and frames (308) captured after the shutter press indication 310. The video can also be captured in a similar way within a camera or other image acquisition device. The preprocessing can include downsampling, conversion to gray scale, and/or smoothing.

At 204, the frame of the input video is preprocessed. Details of example preprocessing are described below in connection with 404-408 of FIG. 4. Processing continues to 206.

At 206, local motion is estimated. Local motion includes movement that is part of a subset of the frames of the video, such as motion associated with a leaf fluttering. For example, local motion vectors can be computed that represent estimations of local motion within one or more pixel patches (i.e., sections or groups of pixels) of the video frame. Details of example local motion estimation are described below in 410-424 of FIG. 4. Processing continues to 208.

At 208, global motion is compensated for. Global motion may include motion that occurs in all or most of the frames of the video. Global motion may result from hand motion. For example, a user taking a picture with a smart phone may have some hand movement before, during, and/or after capturing the image due to hand shake, accidentally dropping the smart phone, etc. The hand movement of the user may appear as global motion within a video that cover the time period from before shutter press until after shutter press. The global motion compensation seeks to reduce or eliminate the effects of global motion to permit the system to recognize static video more accurately than if global motion artifacts were not compensated for. Details of example global motion compensation are described below at 426-428 of FIG. 4. Processing continues to 210.

In block 210, a subject motion score is computed based on entropy of the local motion estimate that has been adjusted by global motion compensation. Details of the entropy-based subject motion score computation are described below at 430-432 of FIG. 4. Processing continues to 212.

At 212, the subject motion score is normalized. Processing continues to 214.

At 214, it is determined whether the input video is a static video. The determination can include using a system or method as described herein to recognize a video of a static scene or subject and provide an indication of a video of a static scene or subject (or of a motion video when there is no static video recognition). Processing continues to 216 or 218 based on the determination.

If the input video is not a static video, at 216 both the input video and the frame are provided to a user. In some embodiments, both the input video and the frame are included in storage. If the input video is a static video, at 218 the frame and not the input video are provided to the user. In some embodiments, the frame and not the input video is kept in storage.

Figure 4:
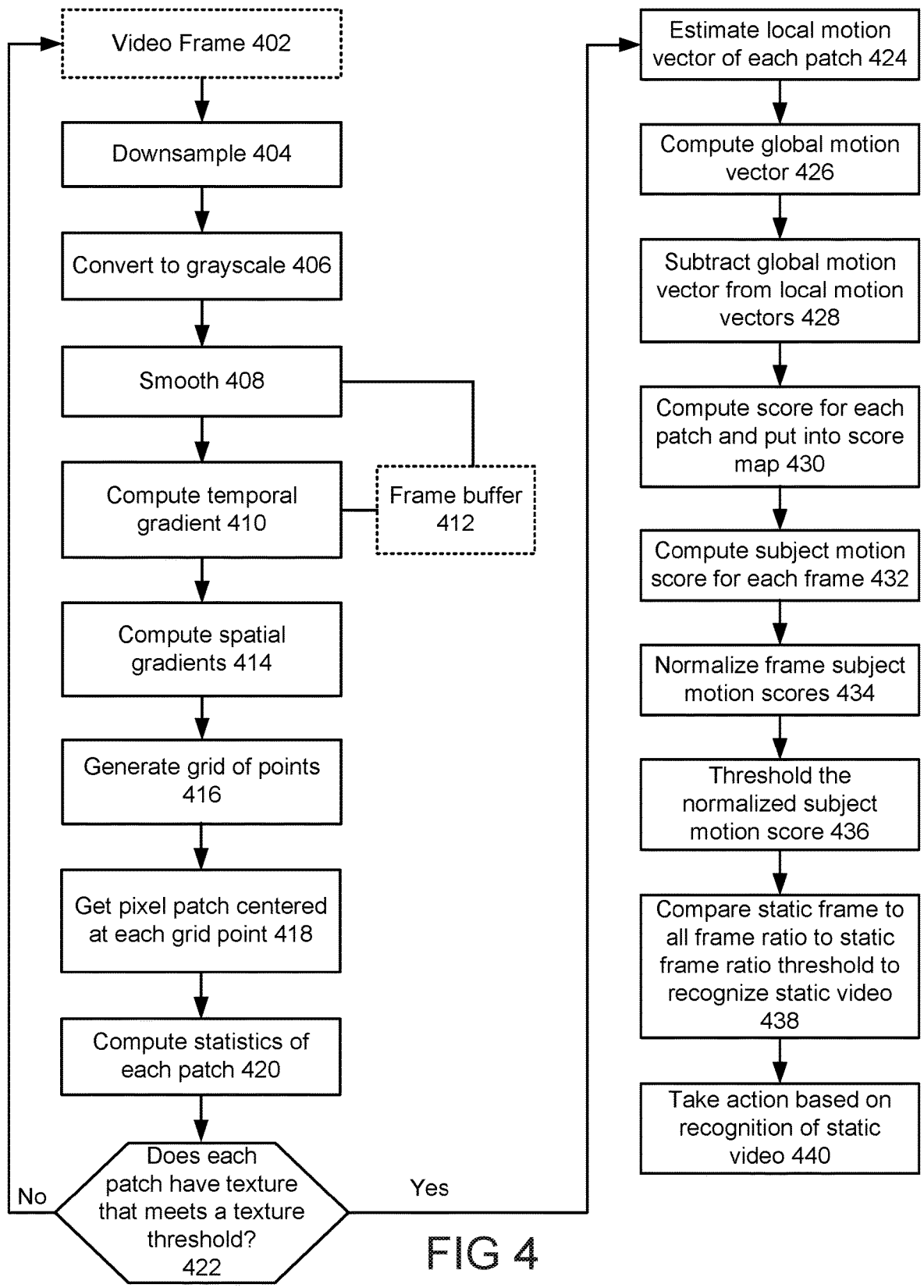
FIG. 4 is a flow diagram illustrating an example method of recognizing static video in accordance with some implementations.

In FIGS. 2 and 4, various blocks (e.g., blocks 202-218, and 402-440, respectively) are illustrated as being performed sequentially. It will be appreciated however that one or more of these blocks may be re-arranged as convenient to suit particular implementations and that these blocks or portions thereof may be performed concurrently in some implementations. It will also be appreciated that in some examples various blocks may be eliminated, divided into additional blocks, and/or combined with other blocks. The table can then be used to determine thresholds based on values in the table.

FIG. 4 is a flow diagram illustrating an example method of recognizing static video in accordance with some implementations. In FIG. 4, 402 and 412 are data or data storage and are shown in dashed lines to help illustrate the method.

In operation, a video frame 402 is obtained. An input video frame may be obtained from among one or more video frames of a video, where the video frames were acquired prior to receiving a shutter press indication and following a receiving of the shutter press indication. For example, the video frames may be captured a predetermined amount of time before and after the shutter press indication, such as two seconds before and after the shutter press indication.

At 404, the video frame is downsampled. Down sampling can include reducing the size (file size, frame size, video resolution, etc.) of the video frame to improve processing time, reduce memory usage, etc. Processing continues to 406.

At 406, the video frame is converted to gray scale. Because color may not be necessary to recognize a static video, converting to grayscale may help speed up processing time and reduce memory usage. Processing continues to 408.

At 408, the downsampled grayscale image is smoothed, as described below.

404-408 can comprise preprocessing. For example, an input video frame 402 may be in high resolution, e.g. 4032×3024. To reduce computation, the input video frame 402 is first downsampled into a much smaller frame I, e.g., 64×48. The input video frame can be in Bayer red green blue (RGB) format or YUV format, in some instances. Grayscale frames can be used to detect if there is motion, so color video frames can be converted into grayscale frames. For example, a 64×48 Bayer frame is obtained and downsampled. The Bayer frame can be converted into grayscale image by averaging the R, Gr, Gb, B channels. To quickly convert the 12/14/16-bit Bayer data into 8-bit and retain the dynamic range, the average value of the Bayer frame is calculated and pixels are scaled by desired_average/average_value, where desired_average is a manually chosen value, e.g., desired_average=128.

To improve the robustness of the technique against image noise, the input frame I can be smoothed by a Gaussian filter and the resulting frame is denoted as I_smoothed. The Gaussian smoothed previous frame is denoted as I_smoothed_previous.

Following preprocessing, local motion is estimated, e.g., in blocks 410-424. Processing continues to 410.

At 410, a temporal gradient is computed using a previous frame from a frame buffer 412 and the current video frame 402. At 414, spatial gradients are computed using the current video frame.

In some implementations, to accelerate local motion estimation, the spatial gradient and temporal gradient of the input frame can be pre-calculated. For example, the spatial gradient and temporal gradient can be calculated as follows:

Mark all overexposed pixels (e.g., pixels with an intensity above a threshold, e.g., "over_expose_threshold") and underexposed pixels (e.g., pixels with an intensity below a threshold, e.g., "under_expose_threshold") as invalid pixels.

Valid(x,y)=1 if under_expose_threshold<=I_smoothed(x, y)<=over_expose_threshold and under_expose_threshold<I_smoothed_previous(x,y) <over_expose_threshold and under_expose_threshold<I_smoothed(x+1,y)<over_expose_threshold and under_expose_threshold<I_smoothed(x−1,y)<over_expose_threshold and under_expose_threshold<I_smoothed(x,y+1)<over_expose_threshold and under_expose_threshold<I_smoothed(x,y−1)<over_expose_threshold Valid(x,y)=0 for else For valid pixels with Valid(x,y)=1, compute three gradients I_t(x,y), I_x(x, y), I_y(x, y) as follows:

The temporal gradient, i.e. the pixel difference between I_smoothed and I_smoothed_previous, is denoted as I_t(x, y)=I_smoothed(x,y)−I_smoothed_previous(x,y).

The spatial gradient of I_smoothed along x direction is denoted as I_x(x, y)=(I_smoothed(x+1,y)−I_smoothed(x−1, y))/2.

The spatial gradient of I_smoothed along y direction is denoted as I_y(x, y)=(I_smoothed(x,y+1)−I_smoothed(x,y−1))/2.

For invalid pixels with Valid(x,y)=0, set I_t(x,y)=I_x(x, y)=I_y(x,y)=0

Processing continues to 416.

At 416, a grid of points is generated, and at 418 a patch of pixels is determined for each grid point.

For example, a grid of points p(i,j) where i is between 1 and gridWidth, j is between 1 and gridHeight, within the frame is computed to do local motion estimation. When calculating the grid, a certain percentage of margin on each side, e.g., 6.25%, can be excluded. The grid points can be evenly spaced, e.g. 4 pixels apart along an x direction, and 4 pixels apart along a y direction. For example, if the frame size is 64×48, exclude 64*6.25%=4 pixels on the four sides, leaving a grid of gridWidth=15 by gridHeight=11.

Processing continues to 420.

At 420, statistics are computed for each patch of pixels. For example:

For each point p(i,j) in the grid, get a patchWidth× patchHeight (e.g. patchWidth=patchHeight=7) patch from I_smoothed.

First collect a set of statistics of this patch:

Ixx is the average of I_x(x,y)*I_x(x,y) for all pixels within the patch.

Iyy is the average of I_y(x,y)*I_y(x,y) for all pixels within the patch.

Ixy is the average of I_x(x,y)*I_y(x,y) for all pixels within the patch.

Ixt is the average of I_x(x,y)*I_t(x,y) for all pixels within the patch.

Iyt is the average of I_y(x,y)*I_t(x,y) for all pixels within the patch.

The computation of the statistics can be optimized by using integral images.

Processing continues to 422.

At 422, it is determined whether each patch has texture that meets a texture threshold. Checking the texture of a patch can be helpful because it is not useful to use textureless patches to detect motion. Also, a patch on an edge may not be helpful to use because the motion can be arbitrary along the edge detection. As a result, if the texture fails to meet the texture threshold, in some embodiments, the method 400 performs the steps starting with 402 until the texture meets the texture threshold. Checking for adequate texture can include:

The Hessian matrix of the patch mentioned above is a 2×2 matrix:
{Ixx Ixy
Ixy Iyy}

The determinant of this matrix is denoted as det. This matrix has two eigenvalues. The larger one is denoted as max_eigenvalue and the smaller one is denoted as min_eigenvalue.

A patch must satisfy the following conditions to be considered as having enough texture:

det>0 and
min_eigenvalue>EigenvalueThreshold*frameWidth*frameHeight
and
max_eigenvalue<EigenvalueRatioThreshold*min_eigenvalue EigenvalueThreshold can be manually tuned and a typical value is 0.0025.

EigenvalueRatioThreshold can also be manually tuned and a typical value is 5.

If a patch failed the above condition check, set the motion vector for that patch to be unavailable and this patch is excluded in the following steps.

motion_x=unavailable.
motion_y=unavailable.

For patches having texture that meets the texture threshold, processing continues to 424.

At 424, a local motion vector is computed to estimate local motion for a corresponding patch. The local motion vector may correspond to a respective candidate pixel patch from among one or more candidate pixel patches within the smoothed video frame, where the local motion vector is based on the spatial gradient and the temporal gradient. For example:

motion_x=(-Ixt*Iyy+Iyt*Ixy)/det
motion_y=(Ixt*Ixy-Iyt*Ixx)/det

Processing continues to 426.

At 426, a global motion vector is computed to estimate global motion. In some embodiments, the global motion vector corresponds to the smoothed video frame. Because there is often small hand movement when users capture photos or videos on mobile devices, an estimation of global camera motion between the current frame and the previous frame is useful to compensate for the global motion. Camera motion can be modeled as a translation vector [global_motion_x, global_motion_y] and estimated by averaging the valid motion vectors from the previous step. Alternatively, an affine model or a homography model can be used with random sample consensus (RANSAC) to estimate the global motion more precisely if more computation is available. Processing continues to 428.

At 428, subject motion vectors are computed by subtracting the global motion vector from local motion vectors. For example:

Subtract the global motion from the motion vectors to get the subject motion vectors [subject_motion_x, subject_motion_y]=[motion_x−global_motion_x, motion_y−global_motion_y].

Processing continues to 430.

At 430, a score for each patch is computed and placed into a score map. For example:

Convert the magnitude of the motion vector to a score between 0 and 1 for each patch to create a score map as follows:

score(i,j)=1−exp(−(subject_motion_x(i,j)*subject_motion_x(i,j)+subject_motion_y(i,j)*subject_motion_y(i,j))/motion_param)

motion_param can be determined manually and in some implementations, a typical value is 3.

Processing continues to 432.

At 432, an entropy-based subject motion score is computed for the video frame. The subject motion score may be based on a corresponding local motion vector and the global motion vector. For example:

First, calculate an entropy score of the score map as following:

total_score=sum(score(k,l)+Epsilon) for all k and l.
p(k,l)=(score(k,l)+Epsilon)/total_score.
entropy=−sum(Log[p(k,l)]*p(k,l))

Epsilon can be a small number to avoid problems caused by 0.

Then, map the entropy into a subject_motion_score corresponding to the smoothed video frame where the subject_motion_score is between 0 and 1 using a nonlinear mapping function:

subject_motion_score=1−exp(entropy*subject_motion_param1)*subject_motion_param2 subject_motion_param1 and subject_motion_param2 are two parameters that are manually tuned.

This subject motion score is large when there is large subject motion in the scene. It is very close to 0 when the scene is static.

Processing continues to 434.

At 434, the subject motion scores for one or more frames are normalized. For example:

For each video, every frame (with frame number i) that was processed for static video recognition received a subject_motion_score(i). The largest value of the subject motion score is denoted as:

subject_motion_score_max=max(subject_motion_score(i)) for all i

Normalize the subject_motion_score_i by subject_motion_score_max if subject_motion_score_i is not too small. For example:

normalized_subject_motion_score_i=subject_motion_score_i/subject_motion_score_max, when subject_motion_score_i>subject_motion_min_threshold normalized_subject_motion_score_i=subject_motion_score_i, when else Processing continues to 436.

At 436, the normalized subject motion scores are thresholded. For example:

Count the number of frames which have low normalized subject motion scores.

number_of_static_frames=count(normalized_subject_motion_score_i<normalized_subject_motion_score_threshold)

Processing continues to 438.

At 438, the ratio of video frames identified as static to all frames in the video is compared against a static frame ratio threshold. For example:

If number_of_static_frames/number_of_all_frames> static_frame_ratio_threshold, mark the video as a static video, otherwise do not mark the video as a static video.

Processing continues to 440.

At 440, an action is taken based on the recognition of a video as static video or not. For example, if a video is recognized as static, one operation is performed, and if the video is recognized as not static, a different operation is performed. In some examples, when a video is recognized as static, the video may be marked as static, a shutter image (or still image) corresponding to the video may be retained in storage, and the video may be deleted from storage. When the video is recognized as not static, both the shutter image (or still image) and the video may be retained in storage (e.g., memory) and, in some examples, the video may be presented to a user, e.g., displayed as successive frames on a display device of a user device or other device.

Figure 5:
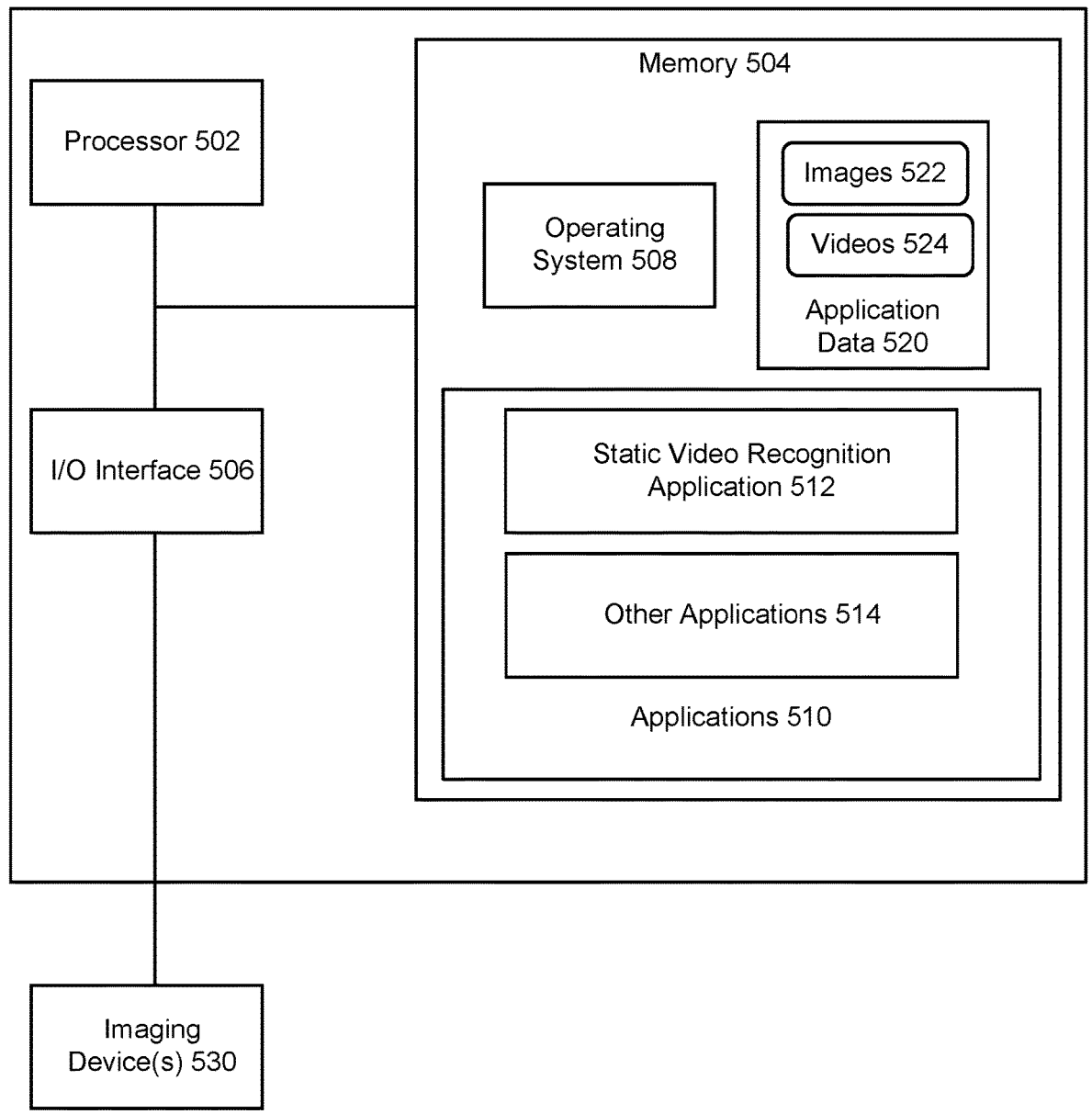
FIG. 5 is a block diagram of an example device which may be used for one or more implementations described herein.

FIG. 5 is a block diagram of an example device 500 which may be used to implement one or more features described herein. In one example, device 500 may be used to implement a computer device, e.g., a server device (e.g., server device 104 of FIG. 1), and perform appropriate method implementations described herein. Device 500 can be any suitable computer system, server, or other electronic or hardware device. For example, the device 500 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 500 includes a processor 502, a memory 504, and I/O interface 506.

Processor 502 can be one or more processors and/or processing circuits to execute program code and control basic operations of the device 500. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 504 is typically provided in device 500 for access by the processor 502, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 502 and/or integrated therewith. Memory 504 can store software operating on the server device 500 by the processor 502, including an operating system 508, one or more applications 510, e.g., a static video recognition application 512, other applications 514 and application data 520. In some implementations, applications 510 can include instructions that enable processor 502 to perform the functions described herein, e.g., some or all of the method of FIGS. 2 and/or 4.

Other applications 514 (or engines) can also or alternatively be included in applications 510, e.g., camera applications, email applications, SMS and other phone communication applications, web browser applications, media display applications, communication applications, web hosting engine or application, social networking engine or application, etc. Any of software in memory 504 can alternatively be stored on any other suitable storage location or computer-readable medium. In addition, memory 504 (and/or other connected storage device(s)) can store application data such as electronic conversation messages, groups of electronic conversation messages, conversational framing elements, user data and preferences, and other instructions and data used in the features described herein. Memory 504 and any other type of storage (magnetic disk, optical disk, magnetic tape, or other tangible media) can be considered "storage" or "storage devices." For example, application data 520 can include images 522 and videos 524.

I/O interface 506 can provide functions to enable interfacing the device 500 with other systems and devices. For example, network communication devices, storage devices (e.g., memory and/or database 106), and input/output devices can communicate via I/O interface 506. In some implementations, the I/O interface can connect to interface devices including input devices (keyboard, pointing device, touchscreen, microphone, camera, scanner, etc.) and/or output devices (display device, speaker devices, printer, motor, haptic output device, etc.). Audio input/output devices 530 are an example of input and output devices that can be used to receive audio input and provide audio output (e.g., voice interface output) as described herein. Audio input/output devices 530 can be connected to device 500 via local connections (e.g., wired bus, wireless interface) and/or via networked connections and can be any suitable devices, some examples of which are described below.

For ease of illustration, FIG. 5 shows one block for each of processor 502, memory 504, I/O interface 506, and software blocks 508 and 510. These blocks may represent one or more processors or processing circuitries, operating systems, memories, I/O interfaces, applications, and/or software modules. In other implementations, device 500 may not have all of the components shown and/or may have other elements including other types of elements instead of, or in addition to, those shown herein. While server system 102 is described as performing operations as described in some implementations herein, any suitable component or combination of components of server system 102 or similar system, or any suitable processor or processors associated with such a system, may perform the operations described.

A client device can also implement and/or be used with features described herein, e.g., client devices 120-126 shown in FIG. 1. Example client devices can be computer devices including some similar components as the device 500, e.g., processor(s) 502, memory 504, and I/O interface 506. An operating system, software and applications suitable for the client device can be provided in memory and used by the processor, e.g., image management software, client group communication application software, etc. The I/O interface for a client device can be connected to network communication devices, as well as to input and output devices, e.g., a camera for capturing images or video, audio speaker devices for outputting sound, a display device for outputting images or video, or other output devices.

One or more methods described herein (e.g., methods 200 and 400) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Any of software in memory can alternatively be stored on any other suitable storage location or computer-readable medium. In addition, the memory (and/or other connected storage device(s)) can store one or more messages, one or more taxonomies, electronic encyclopedia, dictionaries, thesauruses, knowledge bases, message data, grammars, user preferences, and/or other instructions and data used in the features described herein. The memory and any other type of storage (magnetic disk, optical disk, magnetic tape, or other tangible media) can be considered "storage" or "storage devices."

An I/O interface can provide functions to enable interfacing the server device with other systems and devices. Interfaced devices can be included as part of a device or can be separate and communicate with the device. For example, network communication devices, storage devices (e.g., memory and/or database 106), and input/output devices can communicate via the I/O interface. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to the I/O interface can include one or more display devices that can be used to display content, e.g., images, video, and/or a user interface of an output application as described herein. A display device can be connected to a device via local connections (e.g., display bus) and/or via networked connections and can be any suitable display device. The display device can include any suitable display device such as an LCD, LED, or plasma display screen, CRT, television, monitor, touchscreen, 3-D display screen, or other visual display device. For example, the display device can be a flat display screen provided on a mobile device, multiple display screens provided in a goggles or headset device, or a monitor screen for a computer device.

The I/O interface can interface to other input and output devices. Some examples include one or more cameras or other imaging devices which can capture images. Some implementations can provide a microphone for capturing sound (e.g., as a part of captured images, voice commands, etc.), audio speaker devices for outputting sound, or other input and output devices.

Although the description has been described with respect to particular implementations thereof, these particular implementations are merely illustrative, and not restrictive. Concepts illustrated in the examples may be applied to other examples and implementations.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
   estimating local motion of an input video frame of an input video by computing a local motion vector corresponding to a respective candidate pixel patch from among one or more candidate pixel patches within the input video frame;
   estimating global motion by computing a global motion vector;
   computing one or more subject motion vectors based on a corresponding local motion vector and the global motion vector;
   identifying a number of static frames of the input video;
   determining that the input video is a static video if a ratio of the number of static frames to a number of the video frames in the input video meets a static frame threshold and determining that the input video is a motion video if the ratio fails to meet the static frame threshold;
   performing a first operation if the input video is recognized to be the static video; and
   performing a second operation if the input video is recognized to be the motion video.

2. The computer-implemented method of claim 1, further comprising:
   downsampling the input video frame to generate a downsampled video frame;
   smoothing the downsampled video frame to generate a smoothed video frame, wherein the local motion is estimated for the smoothed video frame and the global motion vector corresponds to the smoothed video frame;
   computing a temporal gradient and a spatial gradient for the smoothed video frame by:
      marking underexposed pixels in the smoothed video frame and overexposed pixels in the smoothed video frame as invalid; and
      for valid pixels within the smoothed video frame:
         computing a temporal gradient;
         computing a spatial gradient in an x direction; and
         computing a spatial gradient in a y direction;
   wherein the local motion vector is based on the spatial gradient and the temporal gradient.

3. The computer-implemented method of claim 2, wherein the one or more candidate pixel patches are determined by:
   selecting one or more grid points as reference points within the smoothed video frame for motion estimation;
   selecting a pixel patch width and pixel patch height for a pixel patch corresponding to each of the one or more grid points;
   computing statistics for each pixel patch;
   determining if the pixel patch has a texture that meets a threshold texture value; and
   if the pixel patch has the texture that meets the threshold texture value, identifying the pixel patch as a candidate pixel patch for motion estimation.

4. The computer-implemented method of claim 2, wherein computing the local motion vector includes computing a local x motion value and computing a local y motion value based on the spatial gradient and the temporal gradient for pixels in the candidate pixel patch.

5. The computer-implemented method of claim 1, wherein computing the global motion vector includes computing the global motion vector based on an average of valid local motion vectors.

6. The computer-implemented method of claim 1, wherein computing the one or more subject motion vectors includes subtracting the global motion vector from a respective local motion vector.

7. The computer-implemented method of claim 2, further comprising:
   converting the one or more subject motion vectors into a score map by normalizing a magnitude of a respective subject motion vector for pixels within the smoothed video frame;
   computing an entropy score based on the score map; and
   computing a subject motion score corresponding to the smoothed video frame based on the entropy score, wherein identifying the number of static frames is based on the subject motion score.

8. The computer-implemented method of claim 7, wherein computing the subject motion score, which is inversely correlated to the entropy score on the score map, includes assigning a higher score to the smoothed video frame when motion is localized and assigning a lower score to the smoothed video frame when motion is global within the smoothed video frame.

9. The computer-implemented method of claim 1, wherein the first operation includes marking the input video as static, retaining a shutter image corresponding to the input video in storage, and deleting the input video from storage.

10. The computer-implemented method of claim 1, wherein the second operation includes retaining a shutter image corresponding to the input video and the input video in storage.

11. The computer-implemented method of claim 1, further comprising obtaining the input video frame from among video frames of the input video, wherein the video frames were acquired prior to receiving a shutter press indication and following a receiving of the shutter press indication.

12. A system comprising:
   one or more processors; and
   a memory with instructions stored thereon that, when executed by the one or more processors, cause the one or more processors to perform operations comprising:
      estimating local motion of an input video frame of an input video by computing a local motion vector corresponding to a respective candidate pixel patch from among one or more candidate pixel patches within the input video frame;
      estimating global motion by computing a global motion vector;
      computing one or more subject motion vectors based on a corresponding local motion vector and the global motion vector;
      identifying a number of static frames of the input video;
      determining that the input video is a static video if a ratio of the number of static frames to a number of the video frames in the input video meets a static frame threshold and determining that the input video is a motion video if the ratio fails to meet the static frame threshold;
      performing a first operation if the input video is recognized to be the static video; and
      performing a second operation if the input video is recognized to be the motion video.

13. The system of claim 12, wherein the instructions further cause the one or more processors to perform operations comprising:
   downsampling the input video frame to generate a downsampled video frame;

smoothing the downsampled video frame to generate a smoothed video frame, wherein the local motion is estimated for the smoothed video frame and the global motion vector corresponds to the smoothed video frame;

computing a temporal gradient and a spatial gradient for the smoothed video frame by:
 marking underexposed pixels in the smoothed video frame and overexposed pixels in the smoothed video frame as invalid; and
 for valid pixels within the smoothed video frame:
  computing a temporal gradient;
  computing a spatial gradient in an x direction; and
  computing a spatial gradient in a y direction;
 wherein the local motion vector is based on the spatial gradient and the temporal gradient.

14. The system of claim 13, wherein the one or more candidate pixel patches are determined by:
 selecting one or more grid points as reference points within the smoothed video frame for motion estimation;
 selecting a pixel patch width and pixel patch height for a pixel patch corresponding to each of the one or more grid points;
 computing statistics for each pixel patch;
 determining if the pixel patch has a texture that meets a threshold texture value; and
 if the pixel patch has the texture that meets the threshold texture value, identifying the pixel patch as a candidate pixel patch for motion estimation.

15. The system of claim 13, wherein computing the local motion vector includes computing a local x motion value and computing a local y motion value based on the spatial gradient and the temporal gradient for pixels in the candidate pixel patch.

16. A non-transitory computer readable medium with instructions that, when executed by one or more computers, cause the one or more computers to perform operations, the operations comprising:
 estimating local motion of an input video frame of an input video by computing a local motion vector corresponding to a respective candidate pixel patch from among one or more candidate pixel patches within the input video frame;
 estimating global motion by computing a global motion vector;
 computing one or more subject motion vectors based on a corresponding local motion vector and the global motion vector;
 identifying a number of static frames of the input video;
 determining that the input video is a static video if a ratio of the number of static frames to a number of the video frames in the input video meets a static frame threshold and determining that the input video is a motion video if the ratio fails to meet the static frame threshold;
 performing a first operation if the input video is recognized to be the static video; and
 performing a second operation if the input video is recognized to be the motion video.

17. The computer-readable medium of claim 16, wherein the operations further comprise:
 downsampling the input video frame to generate a downsampled video frame;
 smoothing the downsampled video frame to generate a smoothed video frame, wherein the local motion is estimated for the smoothed video frame and the global motion vector corresponds to the smoothed video frame;
 computing a temporal gradient and a spatial gradient for the smoothed video frame by:
  marking underexposed pixels in the smoothed video frame and overexposed pixels in the smoothed video frame as invalid; and
  for valid pixels within the smoothed video frame:
   computing a temporal gradient;
   computing a spatial gradient in an x direction; and
   computing a spatial gradient in a y direction;
 wherein the local motion vector is based on the spatial gradient and the temporal gradient.

18. The computer-readable medium of claim 17, wherein the one or more candidate pixel patches are determined by:
 selecting one or more grid points as reference points within the smoothed video frame for motion estimation;
 selecting a pixel patch width and pixel patch height for a pixel patch corresponding to each of the one or more grid points;
 computing statistics for each pixel patch;
 determining if the pixel patch has a texture that meets a threshold texture value; and
 if the pixel patch has the texture that meets the threshold texture value, identifying the pixel patch as a candidate pixel patch for motion estimation.

19. The computer-readable medium of claim 17, wherein computing the local motion vector includes computing a local x motion value and computing a local y motion value based on the spatial gradient and the temporal gradient for pixels in the candidate pixel patch.

20. The computer-readable medium of claim 16, wherein computing the global motion vector includes computing the global motion vector based on an average of valid local motion vectors.

\* \* \* \* \*